(12) United States Patent
Lou et al.

(10) Patent No.: US 9,253,483 B2
(45) Date of Patent: Feb. 2, 2016

(54) SIGNALING OF SCALING LIST

(71) Applicant: Google Technology Holdings LLC, Mountain View, CA (US)

(72) Inventors: Jian Lou, San Diego, CA (US); Limin Wang, San Diego, CA (US); Yue Yu, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 344 days.

(21) Appl. No.: 13/830,835

(22) Filed: Mar. 14, 2013

(65) Prior Publication Data
US 2014/0086311 A1    Mar. 27, 2014

Related U.S. Application Data

(60) Provisional application No. 61/705,468, filed on Sep. 25, 2012, provisional application No. 61/705,487, filed on Sep. 25, 2012, provisional application No. 61/707,950, filed on Sep. 29, 2012.

(51) Int. Cl.
*H04N 7/26* (2006.01)
*H04N 19/30* (2014.01)
(Continued)

(52) U.S. Cl.
CPC ....... *H04N 19/00424* (2013.01); *H04N 19/122* (2014.11); *H04N 19/124* (2014.11); *H04N 19/157* (2014.11); *H04N 19/176* (2014.11); *H04N 19/127* (2014.11)

(58) Field of Classification Search
CPC . H04N 19/124; H04N 19/126; H04N 19/132; H04N 19/12; H04N 19/122

USPC ........................................ 375/240.03, 240.18
See application file for complete search history.

(56) References Cited

U.S. PATENT DOCUMENTS 5,754,742 A   5/1998 Astle
5,912,676 A   6/1999 Malladi et al.
(Continued)

FOREIGN PATENT DOCUMENTS

CA   2815985 A1   6/2012
EP   1605403      12/2005
(Continued)

OTHER PUBLICATIONS

Aoki et al., "Prediction-Based QP Derivation", Joint Collaborative Team on Video Coding (JCT-VC) of ITU-T SG16 WP3 and ISO/IEC JTC1/SC29/WG11 5th Meeting: Geneva, CH, Mar. 16-23, 2011.
(Continued)

*Primary Examiner* — Jay Patel
*Assistant Examiner* — Francis G Geroleo
(74) *Attorney, Agent, or Firm* — Young Basile Hanlon & MacFarlane P.C.

(57) ABSTRACT

In one embodiment, a method determines when a scaling list for a non-default quantization matrix is being used to perform quantization of one or more units of video. Transform unit sizes are determined that are not available for performing a transform of the one or more units of video. Then, the method encodes or decodes scaling list data for each of the transform unit sizes available for performing the transform of the one or more units of video. The scaling list data is for transform unit sizes not available for performing the transform of the one or more units of video are not encoded or decoded.

12 Claims, 12 Drawing Sheets

(51) Int. Cl.

| | |
|---|---|
| *H04N 19/176* | (2014.01) |
| *H04N 19/122* | (2014.01) |
| *H04N 19/124* | (2014.01) |
| *H04N 19/157* | (2014.01) |
| *H04N 19/127* | (2014.01) |

(56) References Cited

U.S. PATENT DOCUMENTS

| | | | |
|---|---|---|---|
| 6,028,967 | A | 2/2000 | Kim et al. |
| 6,128,346 | A | 10/2000 | Suarez et al. |
| 6,263,114 | B1 | 7/2001 | Saunders |
| 6,363,119 | B1 | 3/2002 | Oami |
| 6,658,157 | B1* | 12/2003 | Satoh et al. ............... 382/239 |
| 8,891,616 | B1 | 11/2014 | Wilkins |
| 2003/0053541 | A1 | 3/2003 | Sun et al. |
| 2003/0072364 | A1 | 4/2003 | Kim et al. |
| 2005/0002454 | A1 | 1/2005 | Ueno et al. |
| 2005/0084007 | A1 | 4/2005 | Lightstone et al. |
| 2005/0249279 | A1 | 11/2005 | Kondo et al. |
| 2006/0171457 | A1 | 8/2006 | DeGarrido et al. |
| 2007/0065026 | A1 | 3/2007 | Lee et al. |
| 2007/0121731 | A1 | 5/2007 | Tanizawa et al. |
| 2007/0156986 | A1 | 7/2007 | Neiger et al. |
| 2007/0201559 | A1 | 8/2007 | He |
| 2008/0013844 | A1 | 1/2008 | Hu |
| 2008/0225947 | A1 | 9/2008 | Narroschke et al. |
| 2008/0240250 | A1 | 10/2008 | Lin et al. |
| 2009/0010559 | A1 | 1/2009 | Inagaki |
| 2010/0086028 | A1* | 4/2010 | Tanizawa et al. ......... 375/240.12 |
| 2010/0091842 | A1 | 4/2010 | Ikeda et al. |
| 2010/0104021 | A1 | 4/2010 | Schmit |
| 2010/0166061 | A1 | 7/2010 | Kondo et al. |
| 2010/0260268 | A1 | 10/2010 | Cowan et al. |
| 2010/0322306 | A1 | 12/2010 | Au et al. |
| 2011/0026591 | A1 | 2/2011 | Bauza et al. |
| 2011/0038410 | A1 | 2/2011 | Narroschke et al. |
| 2011/0069237 | A1 | 3/2011 | Wang et al. |
| 2011/0304634 | A1 | 12/2011 | Urbach |
| 2012/0114034 | A1 | 5/2012 | Huang et al. |
| 2012/0140815 | A1 | 6/2012 | Zhou et al. |
| 2012/0170647 | A1 | 7/2012 | He et al. |
| 2012/0278665 | A1 | 11/2012 | Serebryany et al. |
| 2012/0314760 | A1 | 12/2012 | He |
| 2013/0022108 | A1 | 1/2013 | Panusopone et al. |
| 2013/0051457 | A1* | 2/2013 | Joshi et al. ............... 375/240.03 |
| 2013/0272390 | A1* | 10/2013 | Joshi et al. ............... 375/240.03 |
| 2014/0044164 | A1 | 2/2014 | Gu et al. |

FOREIGN PATENT DOCUMENTS

| | | |
|---|---|---|
| EP | 2048887 | 4/2009 |
| KR | 20130086012 A | 7/2013 |
| WO | WO03021969 | 3/2003 |
| WO | WO2012102867 | 8/2012 |

OTHER PUBLICATIONS

Arbeiter, J. H. et al.; "A Two-Dimensional Real-Time Video Pyramid Processor", RCA Review, RCA Corp. Princeton, US, vol. 47, No. 1, Mar. 1, 1986, pp. 3-31.

Bankoski et al. "Technical Overview of VP8, an Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Bross et al., "High-Efficiency Video Coding", Joint Collaborative Team on Video Coding (JCT-VC) JCTVCF803 of ITU-T SG16 WP3 and ISO/IEC JTC1/SC29/WG11 6th Meeting: Torino, IT Jul. 14-22, 2011.

Cassidy, An analysis of VP8, a new video codec for the web, 148 pages. Nov. 2011.

Chee, Y-K.; "Survey of Progressive Image Transmission Methods", International Journal of Imaging Systems and Technology, Wiley and Sons, New York, US, vol. 10, No. 1, Jan. 1, 1999, pp. 3-19.

Chuang et al., AHG Quantization: Sub-LCU Delta QP, Joint Collaborative Team on Video Coding(JCT-VC) of ITU-T SG16 WP3 and ISO/IEC JTC1/SC29/WG11 5th Meeting: Geneva,CH, Mar. 16-23, 2011.

Coban et al., CU-Level QP Prediction, Joint Collaborative Team on Video Coding (JCT-VC) of ITU-T SG16 WP3 and ISO/IEC JTC1/SC29/WG11 5th Meeting: Geneva, CH, Mar. 16-23, 2011.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

ISR, & Written Opinion of the International Searching Authority for International Application No. ISR/US2012/045299 (CS38977), May 21, 2013, 16 pages.

Ding et al.; "Two-Layer and adaptive entropy coding algorithms for H. 264-based lossless image coding", Acoustics, Speech and Signal Processing, 2008. ICASSP 2008. IEE International conference on IEEE, Piscatawa, NJ, USA Mar. 31, 2008.

L Dong et al.: "CU Adaptive Quantization Syntax Change for Better Decoder pipelining", Joint Collaborative Team on Video Coding (JCT-VC) of ITU-T SG16 WP3 ans ISO/IEC JTC1/SC29/WG11, vol. JCTVC-D258, Jan. 15, 2011, all pages.

Mozilla, "Introduction to Video Coding Part 1: Transform Coding", Video Compression Overview, Mar. 2012, 171 pp.

Overview; VP7 Data Format and Decoder. Version 1.5. On2 Technologies, Inc. Dated Mar. 28, 2005.

Pai, et al., MPEG 4 constant quality constant bit rate control algorithms, signal processing:image communication, Jan. 2005, vol. 21, Issue 1, pp. 67-89.

Pang et al.,"Improved DPQ Calculation Method", Joint Collaborative Team on Video Coding (JTC-VC) of ITU-T SG16 WP3 and ISO/IEC JTC1/SC29/WG11 5th Meeting: Geneva, CH, Mar. 16-23, 2011.

Price, Thomas B.; "Muscle and Liver Carbohydrates: Response to Military Task Performance by Women and Men", Oct. 1, 1997, http://www.dtic.mil/docs/citations/ADA337501, p. 10.

Schrieber W.F.; "Advanced Television Systems for Terrestrial Broadcasting: Some Problems and Some Proposed Solutions", Proceedings of the IEEE, IEEE New York, US, vol. 83, No. 6, Jun. 1, 1995, pp. 958-981.

Schwarz H. et al.: "SNR-scalable extension of H.264/AVC" , Image Processing, 2004. ICIP 2004 International Conference on Singapore Oct. 24-27, 2004.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May, 2003.

(56) References Cited

OTHER PUBLICATIONS

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

Shima et al., "Support for Sub-LCU-Level QP in HEVC", Joint Collaborative Team on Video Coding (JCT-VC) of ITU-T SG16 WP3 and ISO/IEC JTC1/SC29/WG11 %th Meeting: Geneva, CH, Mar. 16-23, 2011.

Shimono et al.; "Transform Image Coding With Edge Compensation", Electronics and Communications in Japan, Part I: Communications, Hoboken, NJ, US, vol. 74, No. 10, Oct. 1, 1991, pp. 49-56.

Thomas Wiegand; "Working Draft Number 2, Revision 2 (WD-2) H.26L", 2. JVT Meeting; Jan. 29-Feb. 1, 2002;.Geneva, CH; (Joint Video Team of ISO/IEC JTC1/SC29/WG11 and ITU-T SG.16), No. JVT-18r2, Feb. 1, 2002, all pages.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

Wiegand et al., "WD2: Working Draft 2 of High-Efficiency Video Coding," JCTVC-D503, Jan. 2011.

Schrieber W. F.: Advanced Television Systems for Terrestrial Broadcasting: Some Proposed Solutions, IEEE vol. 83, No. 6 , Jun. 1, 1995 pp. 958-981.

International Preliminary Report and Written Opinion for PCT/US2013054311, mailed Feb. 10, 2015, 12 pages.

Flynn D et al.: "Transform Skipping in the presence of Scaling Lists", 101. MPEG Meeting; Jul. 16-20, 2012; Stockholm; (Motion Picture Expert Group or ISO/IEC JTC1/SC29/WG11), No. m25414, Jul. 5, 2012, all pages.

Lou J et al.: "Scling list selection for transform skip mode", 102, MPEG Meeting; Oct. 15-19, 2012; Shanghai; (Motion Picture Expert Group or ISO/IEC JTC1/SC29/WG11), No. m26603, Oct. 4, 2012, all pages.

Osamoto a et al.: "AHG9: A bug fix for scaling list signalling in SPS when transform skipping is enabled", 11, JCT-VC Meeting; 102, MPEG Meeting; Oct. 10-19, 2012; Shanghai; (Joint Collaborative Team on Video Coding of ISO/IEC JTC1/SC29/WG11 and ITU-T SG.16); URL:HTTP://WFTP3.ITU.INT/AV-ARCH/JCTVC-SITE/, No. JCTVC-K0203, Oct. 1, 2012, all pages.

Patent Cooperation Treaty, International Search Report and Written Opinion of the International Searching Authority for International Application No. PCT/US2013/058376, Nov. 22, 2013, 12 pages.

B. Bross, W.-J. Han, J.-R. Ohm, G. J. Sullivan, T. Wiegand, "High efficiency video coding (HEVC) text specification draft 8," Document of Joint Collaborative Team on Video Coding, JCTVC-J1003_d7, 10th Meeting: Stockholm, SE, Jul. 11-20, 2012, 260 pages.

\* cited by examiner

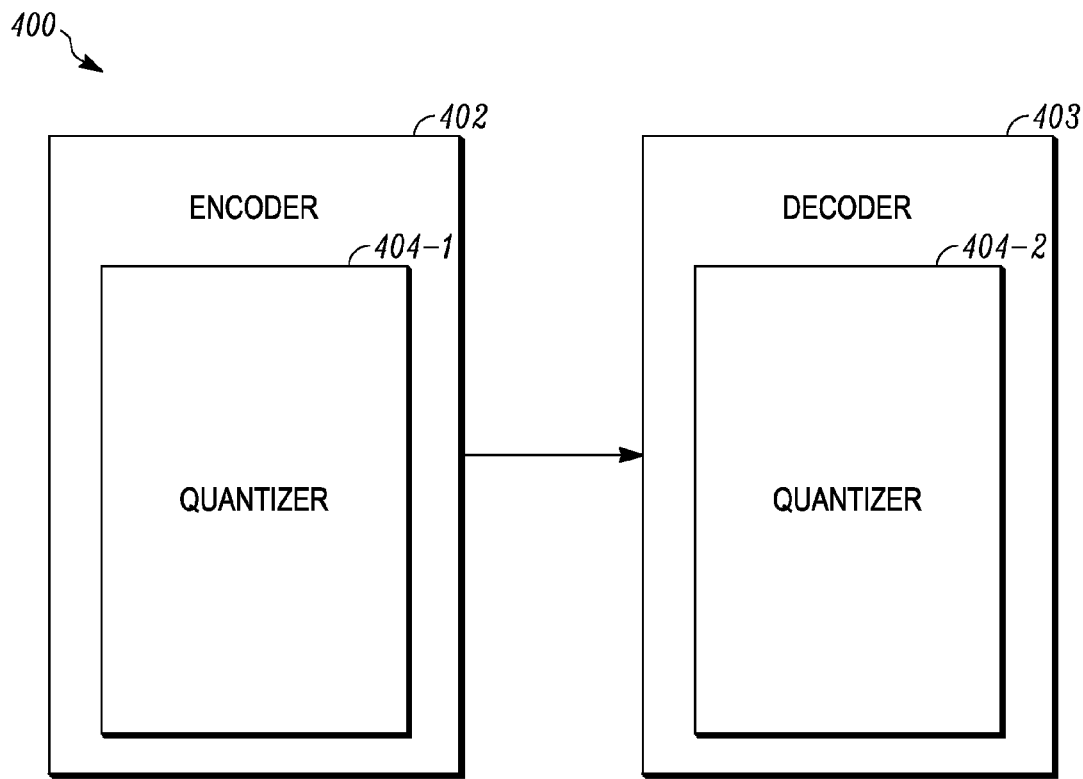

| | |
|---|---|
| ...... | |
| pps_scaling_list_data_present_flag | u(1) |
| if( pps_scaling_list_data_present_flag | |
|    scaling_list_data( ) | |
| ...... | |

602 → pps_scaling_list_data_present_flag
604 → if( pps_scaling_list_data_present_flag

FIG. 6

| scaling_list_data( ) { | DESCRIPTOR |
|---|---|
| for( sizeID = log2_min_transform_block_size_minus2; sizeID <= log2_min_transform_block_size_minus2+ log2_diff_max_min_transform_block_size; sizeID++ ) | |
|   for(matrixID = 0;matrixID < ( sizeID == 3 )? 2 : 6 ; matrixID++ ) { | |
|     scaling_list_pred_mode_flag | u(1) |
|     if( !scaling_list_pred_mode_flag ) | |
|       scaling_list_pred_matrix_id_delta | ue(v) |
|     else | |
|       scaling_list_for_matrix( sizeID, matrixID ) | |
|   } | |
| } | |

FIG. 7

| sps_scaling_list_data( ) { | DESCRIPTOR |
|---|---|
| for( sizeID = log2_min_transform_block_size_minus2; sizeID <= log2_min_transform_block_size_minus2+ log2_diff_max_min_transform_block_size; sizeID++ ) | |
| for(matrixID = 0;matrixID < ( sizeID == 3 )? 2 : 6 ; matrixID++ ) { | |
| scaling_list_pred_mode_flag | u(1) |
| if( !scaling_list_pred_mode_flag ) | |
| scaling_list_pred_matrix_id_delta | ue(v) |
| else | |
| scaling_list_for_matrix( sizeID, matrixID ) | |
| } | |
| } | |

FIG. 8A

| pps_scaling_list_data( ) { | DESCRIPTOR |
|---|---|
| for( sizeID = 0; sizeID < 4; sizeID++ ) | |
| for( matrixID = 0;matrixID < ( sizeID == 3 )? 2 : 6 ; matrixID++ ) { | |
| scaling_list_pred_mode_flag | u(1) |
| if( !scaling_list_pred_mode_flag ) | |
| scaling_list_pred_matrix_id_delta | ue(v) |
| else | |
| scaling_list_for_matrix( sizeID, matrixID ) | |
| } | |
| } | |

FIG. 8B

| | |
|---|---|
| ...... | |
| scaling_list_enable_flag | u(1) |
| if( scaling_list_enable_flag ) { | |
|    sps_scaling_list_data_present_flag | u(1) |
|    if( sps_scaling_list_data_present_flag ) | |
|       sps_scaling_list_data( ) | |
| } | |
| ...... | |

FIG. 8C

| | |
|---|---|
| ...... | |
| pps_scaling_list_data_present_flag | u(1) |
| if( pps_scaling_list_data_present_flag ) | |
|    pps_scaling_list_data( ) | |
| ...... | |

FIG. 8D

|  |  |  |  |
|---|---|---|---|
| 70 | 41 | 25 | 21 |
| 41 | 30 | 20 | 17 |
| 25 | 20 | 17 | 16 |
| 21 | 17 | 16 | 16 |

FIG. 12A

|  |  |  |  |
|---|---|---|---|
| 57 | 36 | 24 | 21 |
| 36 | 24 | 21 | 17 |
| 24 | 21 | 17 | 16 |
| 21 | 17 | 16 | 16 |

FIG. 12B

SIGNALING OF SCALING LIST

CROSS-REFERENCES TO RELATED APPLICATIONS

The present disclosure claims priority to:
U.S. Provisional App. No. 61/705,468, entitled "Scaling List Indication", filed Sep. 25, 2012;
U.S. Provisional App. No. 61/705,487, entitled "Non-Flat Quantization Matrices for Transform Skip Mode", filed Sep. 25, 2012; and
U.S. Provisional App. No. 61/707,950, entitled "Setting Default Quantization Matrices for Luma and Chroma with Transform Skip Mode", filed Sep. 29, 2012, the contents of all of which are incorporated herein by reference in its entirety.

BACKGROUND

Video compression systems employ block processing for most of the compression operations. A block is a group of neighboring pixels and may be treated as one coding unit in terms of the compression operations. Theoretically, a larger coding unit is preferred to take advantage of correlation among immediate neighboring pixels. Various video compression standards, e.g., Motion Picture Expert Group (MPEG)-1, MPEG-2, and MPEG-4, use block sizes of 4×4, 8×8, and 16×16 (referred to as a macroblock (MB)).

High efficiency video coding (HEVC) is also a block-based hybrid spatial and temporal predictive coding scheme. HEVC partitions an input picture into square blocks referred to as coding tree units (CTUs) as shown in FIG. 1. Unlike prior coding standards, the CTU can be as large as 128×128 pixels. Each CTU can be partitioned into smaller square blocks called coding units (CUs). FIG. 2 shows an example of a CTU partition of CUs. A CTU 100 is first partitioned into four CUs 102. Each CU 102 may also be further split into four smaller CUs 102 that are a quarter of the size of the CU 102. This partitioning process can be repeated based on certain criteria, such as limits to the number of times a CU can be partitioned may be imposed. As shown, CUs 102-1, 102-3, and 102-4 are a quarter of the size of CTU 100. Further, a CU 102-2 has been split into four CUs 102-5, 102-6, 102-7, and 102-8.

Each CU 102 may include one or more blocks, which may be referred to as prediction units (PUs). FIG. 3A shows an example of a CU partition of PUs. The PUs may be used to perform spatial prediction or temporal prediction. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s).

Unlike prior standards where only one transform of 8×8 or 4×4 is applied to a macroblock, a set of block transforms of different sizes may be applied to a CU 102. For example, the CU partition of PUs 202 shown in FIG. 3A may be associated with a set of transform units (TUs) 204 shown in FIG. 3B. In FIG. 3B, PU 202-1 is partitioned into four TUs 204-5-204-8. Also, TUs 204-2, 204-3, and 204-4 are the same size as corresponding PUs 202-2-202-4. Each TU 204 can include one or more transform coefficients. Transform coefficients of the TU 204 can be quantized into one of a finite number of possible values. After the transform coefficients have been quantized, the quantized transform coefficients can be entropy coded to obtain the final compressed bits that can be sent to a decoder.

BRIEF DESCRIPTION OF THE DRAWINGS

FIG. 4 depicts an example of a system for encoding and decoding video content according to one embodiment.
FIG. 5 depicts a syntax for a scaling list syntax according to one embodiment.
FIG. 6 depicts an example of a PPS scaling list syntax according to one embodiment.
FIG. 7 depicts an example of a syntax that takes into account which transform sizes are not available and does not send scaling list data for those transform sizes.
FIGS. 8A, 8B, 8C, and 8D illustrate modified syntaxes for the SPS and PPS syntaxes.
FIGS. 12A and 12B show examples of quantization matrices according to one embodiment.

DETAILED DESCRIPTION

Figure 1:
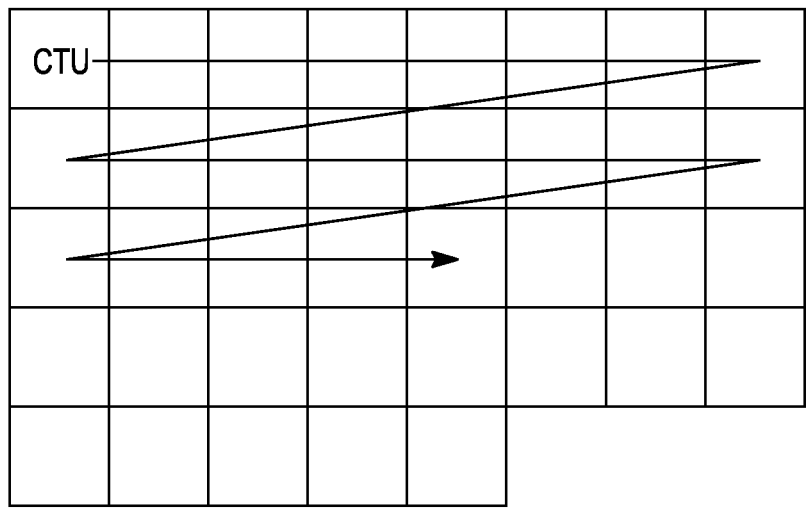
FIG. 1 shows an input picture partitioned into square blocks referred to as coding tree units (CTUs).
Figure 2:
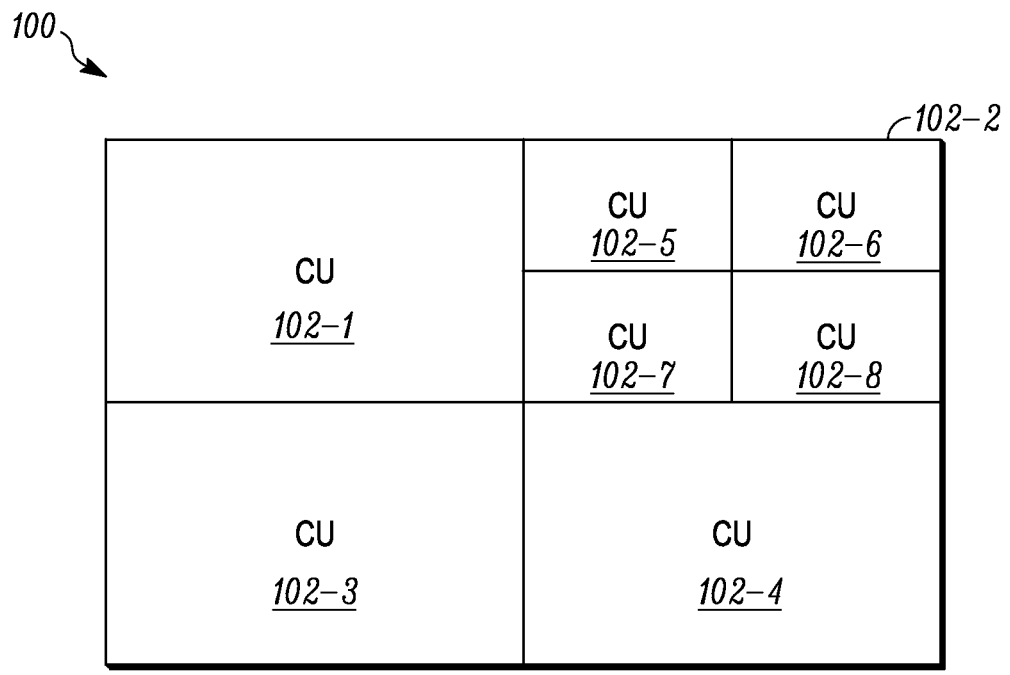
FIG. 2 shows an example of a CTU partition of CUs.
Figure 3A:
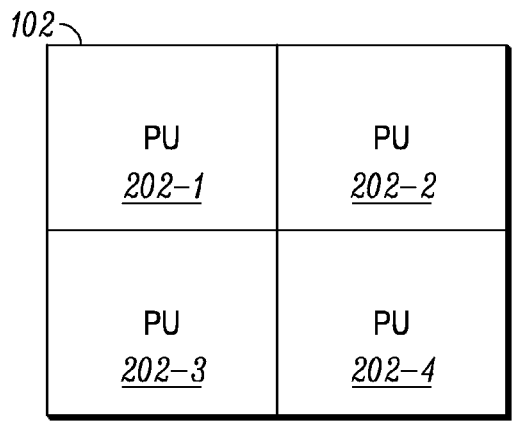
FIG. 3A shows an example of a CU partition of PUs.
Figure 3B:
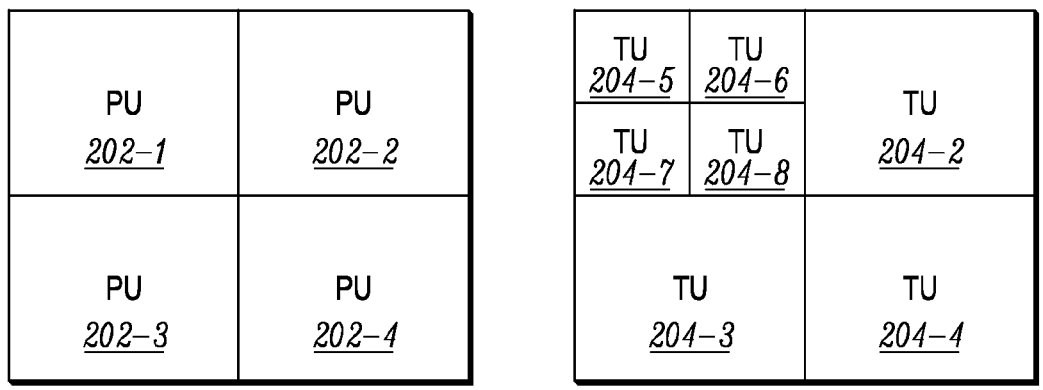
FIG. 3B shows an example of a TU partition of PUs.

Described herein are techniques for a video compression system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

In one embodiment, a method determines when a scaling list for a non-default quantization matrix is being used to perform quantization of one or more units of video. Transform unit sizes are determined that are not available for performing a transform of the one or more units of video. Then, the method encodes or decodes scaling list data for each of the transform unit sizes available for performing the transform of the one or more units of video. The scaling list data is for transform unit sizes not available for performing the transform of the one or more units of video are not encoded or decoded.

In one embodiment, an encoder includes: one or more computer processors; and a non-transitory computer-readable storage medium comprising instructions, that when executed, control the one or more computer processors to be configured for: determining when a scaling list for a non-default quantization matrix is being used to perform quantization of one or more units of video; determining transform unit sizes that are not available for performing a transform of the one or more units of video; encoding scaling list data for each of the transform unit sizes available for performing the transform of the one or more units of video, wherein scaling list data for transform unit sizes not available for performing the transform of the one or more units of video are not encoded or decoded; encoding the one or more units of video using at least a portion of the scaling list data; and sending the scaling list data in an encoded bitstream including the encoded one or more units of video.

In one embodiment, a decoder includes: one or more computer processors; and a non-transitory computer-readable storage medium comprising instructions, that when executed, control the one or more computer processors to be configured for: receiving an encoded bitstream; determining when a scaling list for a non-default quantization matrix is being used to perform quantization of one or more units of video; determining transform unit sizes that are not available for performing a transform of the one or more units of video; decoding scaling list data for each of the transform unit sizes available for performing the transform of the one or more units of video from the encoded bitstream, wherein scaling list data for transform unit sizes not available for performing the transform of the one or more units of video are not encoded or decoded; and decoding the one or more units of video using at least a portion of the scaling list data.

Some embodiments may include signaling of scaling list data.

FIG. 4 depicts an example of a system 400 for encoding and decoding video content according to one embodiment. Encoder 402 and decoder 403 may encode and decode a bitstream using HEVC; however, other video compression standards may also be appreciated.

Encoder 402 includes a quantizer 404-1 and decoder 403 includes a quantizer 404-2. Quantizers 404 perform quantization (both quantization and/or de-quantization) to convert transform coefficients of a residual signal into a finite number of possible values. Quantization uses a quantization matrix to perform the quantization. In one example, the quantization matrix may be "flat", which means each value of the quantization matrix is the same value. In other examples, quantization may use a "non-flat" quantization matrix in which the values vary. The values of the non-flat quantization matrix may be referred to as a scaling list. For example, in quantization, transform coefficients are multiplied by the corresponding values of the scaling list and then divided by a constant number, such as the number of blocks in quantization matrix (e.g., 16 when using a 4×4 block). The scaling list includes the corresponding values of the quantization matrix that "scale" the transform coefficients.

A unit of video, such as a prediction unit, may be subtracted with a prediction block to form a residual in the spatial domain. The residual signal may then be transformed into another domain. After transformation, the residual signal may be transformed into a set of transform coefficients. The transform coefficients may represent low-to-high frequency information. High frequency information may be areas where more abrupt changes occur in an image.

A non-flat scaling list may be used to provide better compression efficiency by leveraging the sensitivity to low frequency and high frequency information for a human visual system. The human visual system may be less sensitive to high-frequency information. That is, in terms of coding in the transform domain, the human visual system may tolerate more coding distortion for high-frequency transform coefficients than for low-frequency transform coefficients. The values of the scaling list may be tailored in view of the above. For example, the scaling list may be designed to have more quantization for high-frequency transform coefficients than for low-frequency transform coefficients. In general, when more quantization is used, the loss of information may be greater resulting in more distortion. This is why more quantization may be used for high-frequency transform coefficients because the human visual system is less sensitive to high-frequency information and may not notice additional distortion in the high-frequency information. Using more quantization results in more distortion, but also provides greater compression.

In one embodiment, default non-flat quantization matrices may be provided. Tables 1 and 2 show examples of default non-flat quantization matrices for 4×4 TUs.

TABLE 1

Non-flat quantization matrix for 4 × 4 Intra transform blocks

| 16 | 16 | 17 | 21 |
| 16 | 17 | 20 | 25 |
| 17 | 20 | 30 | 41 |
| 21 | 25 | 41 | 70 |

TABLE 2

Non-flat quantization matrix for 4 × 4 Inter transform blocks

| 16 | 16 | 17 | 21 |
| 16 | 17 | 21 | 24 |
| 17 | 21 | 24 | 36 |
| 21 | 24 | 36 | 57 |

As shown in the quantization matrices in Tables 1 and 2, the quantization values, which are proportional to the quantization step sizes, increase towards the lower right corner of the matrices. The higher quantization numbers mean that transform coefficients are quantized more resulting in higher information loss. The high-frequency information may be located more in the lower right hand corner of the quantization matrix and thus the higher quantization numbers are included in the lower right-hand side of the quantization matrix.

When using default quantization matrices, encoder 402 and decoder 403 do not need to signal the values for the scaling list. Rather, both encoder 402 and decoder 403 are preconfigured with the values. However, encoder 402 and decoder 403 may also use quantization matrices other than the default quantization matrices. In this case, encoder 402 needs to signal the values for the scaling list to decoder 403. Particular embodiments provide a syntax for doing so. In one embodiment, particular embodiments also do not signal values for a scaling list for transform unit sizes that are not used in the transform process. This will be described in more detail below.

FIG. 5 depicts a syntax 500 for a scaling list syntax according to one embodiment. At 502, a scaling_list_enable_flag specifies whether a scaling list is used for the scaling process for transform coefficients. When the flag scaling_list_enable_ flag is enabled, such as equal to 1, this specifies that a scaling list is used for the scaling process for transform coefficients. In other words, a non-flat quantization matrix is used. When the flag scaling_list_enable_flag is not enabled, such as equal to 0, this means that the scaling list is not used for the scaling process for transform coefficients. In this case, a flat quantization matrix may be used.

At 504, syntax 500 tests whether the flag scaling_list_enable_flag is enabled or not. If the flag scaling_list_enable_ flag is enabled, then a flag SPS_scaling_list_data_present_ flag is included. The flag SPS_scaling_list_data_present_flag is used to specify whether scaling list data is present in the sequence parameter set (SPS), where the SPS is applicable to a series of active pictures. That is, encoder 402 is signaling values for a non-default scaling list to decoder 403. Although the SPS is described, syntax 500 may be used for other portions of video, such as a picture parameter set (PPS), where the PPS is applicable to an active picture.

At 508, syntax 500 tests whether the flag SPS_scaling_list_data_present_flag is enabled or not. When the flag SPS_scaling_list_data_present_flag is enabled, such as equal to 1, this specifies that scaling list data is present in the sequence parameter set. That is, scaling list data (e.g., scaling list values in the quantization matrix) is included in the encoded bitstream for active pictures associated with the SPS. For example, encoder 402 may encode the scaling list data in the encoded bitstream for a non-default non-flat quantization matrix that should be used to perform quantization. A decoder 403 may then use the scaling list data when performing an inverse quantization instead of using a flat quantization matrix or one of the default quantization matrices. When the flag SPS_scaling_list_data_present_flag is not enabled, such as equal to 0, this specifies that scaling list data is not present in the sequence parameter set. In this case, decoder 403 may use one of the default quantization matrices. When the flag SPS_scaling_list_data_present_flag is not present in the encoded bitstream, the value of the flag SPS_scaling_list_data_present_flag is inferred to be 0. For example, decoder 403 may set the value of the flag SPS_scaling_list_data_present_flag to 0 if the flag is not found in the encoded bitstream.

In one embodiment, syntax 500 may be for a header associated with a portion of video being encoded or decoded. For example, the header may be a sequence parameter set (SPS) header that is associated with a series of pictures. Thus, syntax 500 governs the series of pictures. In other examples, portions of syntax 500, such as the flags scaling_list_enable_flag and SPS_scaling_list_data_present_flag, may be included in other headers.

A scaling list may also be used at the picture parameter set (PPS) level. FIG. 6 depicts an example of a PPS scaling list syntax 600 according to one embodiment. Syntax 600 is used to indicate whether or not scaling list data is included for a picture. At 602, a flag PPS_scaling_list_data_present_flag is used to specify that parameters are present to modify the scaling lists specified in the sequence parameter set. When the flag PPS_scaling_list_data_present_flag is enabled, such as equal to 1, this specifies that parameters are present to modify the scaling list specified in the sequence parameter set. When the flag PPS_scaling_list_data_present_flag is not enabled, such as equal to 0, this specifies that the scaling list used for the pictures referring to the picture parameter set shall be inferred to be equal to those specified by the sequence parameter set. In other words, the scaling lists specified by the sequence parameter set are used at the PPS level. Also, when the flag scaling_list_enabled_flag is equal to 0, then the value of the flag PPS_scaling_list_data_present_flag is also 0 (i.e., the value cannot be 1 if the flag scaling_list_enabled_flag is equal to 0).

At 604, syntax 600 tests whether the flag PPS_scaling_list_data_present_flag is enabled or not. If the flag PPS_scaling_list_data_present_flag is enabled, or equal to 1, then scaling list data for the picture parameter set is included in the encoded bitstream. For example, encoder 402 includes parameters to modify the scaling lists specified in the sequence parameter set in the encoded bitstream. Decoder 403 also decodes these parameters.

In encoding and decoding video, particular embodiments may use different sizes for transform units as discussed above. However, for certain portions of video, such as a picture parameter set or sequence parameter set, some transform sizes may not be used in the transform process. Particular embodiments determine which transform sizes are not used and may not include scaling list data syntax for the transform sizes that are not used. Thus, encoder 402 and decoder 403 do not need to encode or decode the scaling list data syntax for the transform sizes that are not being used. This reduces overhead in the encoded bitstream and also computational complexity because scaling list data is not included for transform units that are not used in the transformation process and also encoder 402 and decoder 403 do not need to evaluate conditional statements in the syntax for the transform unit sizes that are not being used.

In one embodiment, particular embodiments do not encode or decode the scaling list data syntax as follows:
   if the transform size could not be 4×4, scaling list data syntax for 4×4 TUs does not need to be encoded/decoded;
   if the transform size could not be 8×8, scaling list data syntax for 8×8 TUs does not need to be encoded/decoded;
   if the transform size could not be 16×16, scaling list data syntax for 16×16 TUs does not need to be encoded/decoded;
   if the transform size could not be 32×32, scaling list data syntax for 32×32 TUs does not need to be encoded/decoded, etc.

FIG. 7 depicts an example of a syntax 700 that takes into account which transform sizes are not available and does not send scaling list data for those transform sizes. At 702, a syntax log 2_min_transform_block_size_minus2 specifies a minimum transform size. A variable log 2MinTrafoSize, which is referred to as "sizeID" in FIG. 7, is set equal to the syntax log 2_min_transform_block_size_minus2. In some embodiments, the value 2 may be added to the sizeID (not expressly shown). The variable log 2MinTrafoSize thus indicates the minimum transform unit size used in the transform process for the SPS. The encoded bitstream does not contain scaling list data for TU sizes equal to or smaller than log 2MinCbSize when the variable log 2MinTrafoSize is greater than or equal to the variable log 2MinCbSize, which is the minimum coding block size. The syntax log 2_diff_max_min_transform_block_size specifies the difference between the maximum transform size and the minimum transform size.

At 704, syntax 700 specifies scaling list data is included for the transform unit sizes specified at 702. Thus, the syntax at 702 specifies that encoder 402 encodes scaling list data for transform units from the minimum to the maximum size transform units. In some cases, transform units from within the range may not be used, such as for the range 4×4 to 32×32, the 4×4 scaling list is encoded, 8×8 scaling list is not, but 16×16 is encoded. The scaling list data syntax may include the flag scaling_list_pred_mode_flag, the syntax scaling_list_pred_matrix_id_delta and the syntax for the scaling list matrix may include the syntax scaling_list_dc_coef_minus8 and the syntax scaling_list_delta_coef.

In one embodiment, different functions could be used for the SPS and PPS. FIGS. 8A, 8B, 8C, and 8D illustrate modified syntaxes for the SPS and PPS syntaxes. FIGS. 8A and 8B illustrate different syntaxes that can be separately used to send scaling list data for an SPS and a PPS. FIGS. 8C and 8D show respective syntaxes for determining when to insert scaling list data at the SPS level and PPS level.

Figure 9:
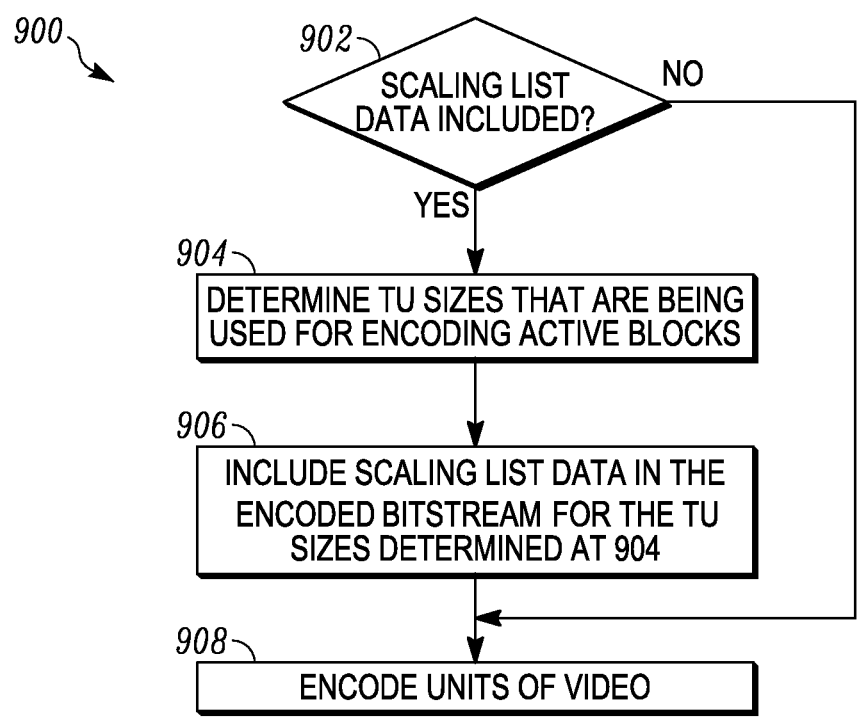
FIG. 9 depicts a simplified flowchart of a method for encoding scaling list data according to one embodiment.

FIG. 9 depicts a simplified flowchart 900 of a method for encoding scaling list data according to one embodiment. At 902, encoder 402 determines if scaling list data should be included in the encoded bitstream for one or more units of video. For example, encoder 402 evaluates flags scaling_list_enable_flag and SPS_scaling_list_data_present_flag to determine whether to include scaling list data in the encoded bitstream.

At 904, encoder 402 determines TU sizes that are being used for encoding active blocks. For example, encoder 402 evaluates the syntax shown at 704 in FIG. 7. At 906, encoder 402 includes scaling list data in the encoded bitstream for the TU sizes determined at 904. For example, encoder 402 evaluates the syntax shown at 706 in FIG. 7. At 908, encoder 402 encodes the one or more units of video.

Figure 10:
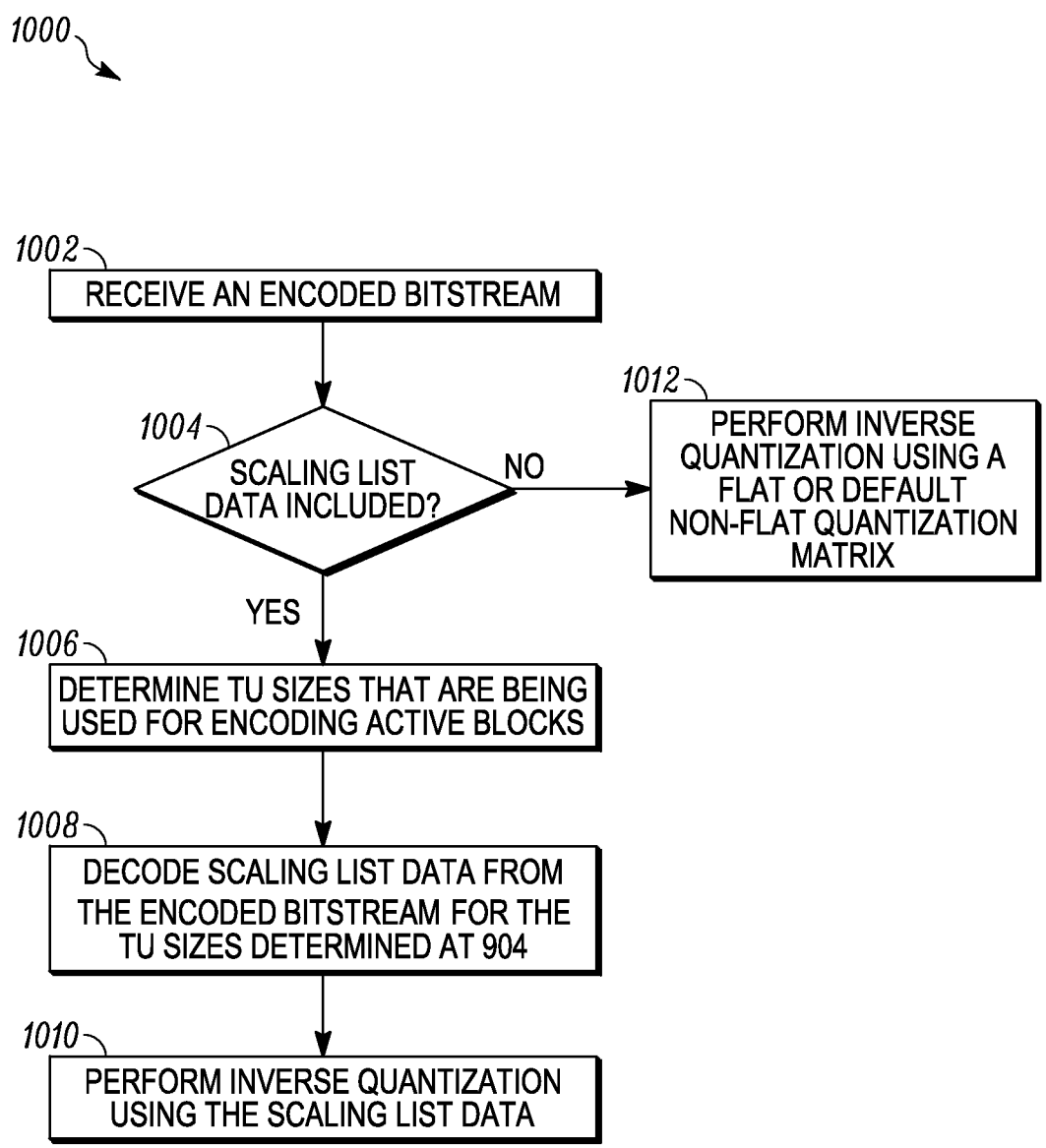
FIG. 10 depicts a simplified flowchart of a method for decoding scaling list data according to one embodiment.

FIG. 10 depicts a simplified flowchart 1000 of a method for decoding scaling list data according to one embodiment. At 1002, decoder 403 receives an encoded bitstream. At 1004, decoder 403 determines if scaling list data is included in the encoded bitstream. For example, decoder 403 evaluates flags scaling_list_enable_flag and SPS_scaling_list_data_present_flag to determine whether scaling list data is included in the encoded bitstream.

If included, at 1006, decoder 403 determines TU sizes that are being used for decoding active blocks. For example, decoder 403 evaluates the syntax shown at 704 in FIG. 7. At 1008, decoder 403 decodes scaling list data from the encoded bitstream for the TU sizes determined at 904. For example, decoder 403 evaluates the syntax shown at 706 in FIG. 7. At 1010, decoder 403 performs inverse quantization using the scaling list data. If scaling list data was not included, at 1012, decoder 403 performs inverse quantization using a flat or default non-flat quantization matrix.

Some embodiments may include using non-flat quantization matrices for transform skip mode.

Transform skip (TS) is an extra mode for intra- and inter-prediction of blocks, such as 4×4 blocks. In some examples, when transform skip is enabled, a default flat quantization matrix with all values equal to 16 is used for both transform skip and non-transform skip TUs, such as 4×4 TUs. However, the default flat quantization matrix may not result in good compression efficiency for some 4×4 TUs. In intra-prediction, predictors are generated from the left-neighboring reconstructed pixels, the top-neighboring reconstructed pixels, or both the left- and top-neighboring reconstructed pixels. In other words, given a current block, its right-most column of reconstructed pixels and the bottom row of reconstructed pixels may be used for intra-predictor generation for the neighboring block on the right or below, respectively. Thus, a better reconstruction of the right-most column of pixels and the bottom row of pixels may help to generate a better intra-predictor for the neighboring block on the right or below, which may improve the overall compression performance. As will be discussed below, particular embodiments may achieve a better reconstruction by adjusting the scaling list data in a quantization matrix used in quantization.

Figure 11:
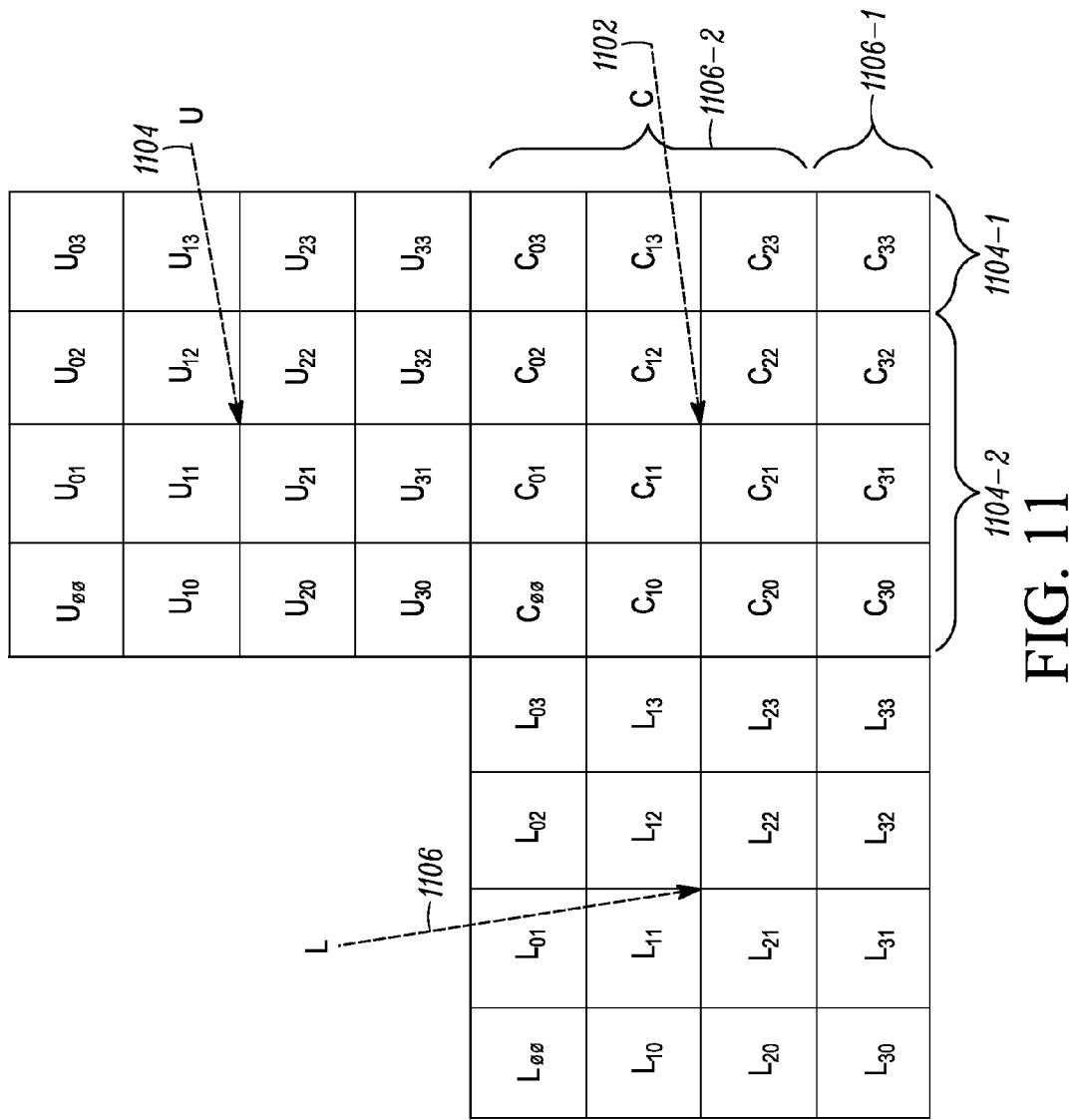
FIG. 11 depicts an example of spatial-neighboring blocks according to one embodiment.

FIG. 11 depicts an example of spatial-neighboring blocks according to one embodiment. At 1102, a current block C is the block currently being encoded or decoded. At 1104, an upper block U is the upper block of C and at 1106, a left block L is the left block of current block C. Upper block U and left block L have been already decoded or reconstructed. The reconstructed pixels $U_{30}$, $U_{31}$, $U_{32}$, and $U_{33}$ from upper block U may be used to generate predictors of pixels in block C. A predictor is set of pixel value predictors that may be subtracted from the pixel values of a block in current block C. The difference between the pixel predictor values and the pixel values of the current block may then be signaled in the encoded bitstream. Also, the reconstructed pixels $L_{03}$, $L_{13}$, $L_{23}$, and $L_{33}$ from lower block L may be used to generate the predictors of pixels in block C. Although the upper and lower spatial-neighboring blocks are used, other neighboring blocks may also be used and also the size of blocks may vary and may not always be 4×4.

Particular embodiments use non-flat quantization matrices/scaling lists for TUs when in TS mode. The quantization matrices may have smaller scaling list data for pixels on the right column and bottom row of a TU in the TS mode. The smaller scaling list data may mean that quantization is less for these pixels, which means less loss of data may occur when a block is reconstructed.

In one example, given a current TU in block C when in TS mode, the scaling list data for the pixels on the right column is smaller than the scaling list data for the pixels on the three left columns. For example, the column in block C shown at 1104-1 may have scaling list data that is smaller than the scaling list data for pixels shown in the columns at 1104-2. Also, the scaling list data for the pixels on the bottom row shown at 1106-1 may be smaller than the scaling list data for the pixels shown on the top three rows at 1106-2.

In another example, at least one row, such as the right-most row, has scaling list data that is smaller than the left-most scaling list data in the row. Or, in at least one column, the bottom scaling list data is smaller than the top scaling list data in the same column.

In one embodiment, default non-flat quantization matrices that are used for non-TS mode TUs may be used in the TS mode; however, these quantization matrices may be adjusted. In one embodiment, the quantization matrices may be rotated by 180°. FIGS. 12A and 12B show examples of quantization matrices according to one embodiment. In FIG. 12A, a non-flat quantization matrix has been rotated by 180°. In this case, in a row shown at 1202 and a column shown at 1204, the scaling list data is smaller towards the right-bottom corner. In FIG. 12B, the same is true as shown at 1206 and 1208 as the scaling list data is smaller towards the bottom-right most corner of the quantization matrix.

Some embodiments may include setting default quantization matrices for luminance and chrominance with transform skip mode.

In one embodiment, for the transform skip mode, blocks in which TS mode is used is very small for both luma and chroma. For the luma component, the percentage of blocks that use TS mode is larger, but still less than 30%. For the chroma component, the percentage of blocks that use TS mode is negligible. Therefore, particular embodiments use a default flat quantization matrix with all values equal to 16 when transform skip mode is enabled for all 4×4 luma TUs with and without transform skip. Also, particular embodiments use non-flat quantization matrices for all 4×4 chroma TUs with and without transform skip.

In the above, non-flat quantization matrices may be used in chroma, but the number of transform skip blocks for chroma is very low. Even though non-flat may not result in the best compression result for transform skip blocks, a human visual system is less sensitive to chroma and thus may not notice a difference. For luma, flat quantization matrices may be used for luma when in the skip mode. This may provide better compression efficiency.

Encoder and decoder examples are described below.

Figure 13A:
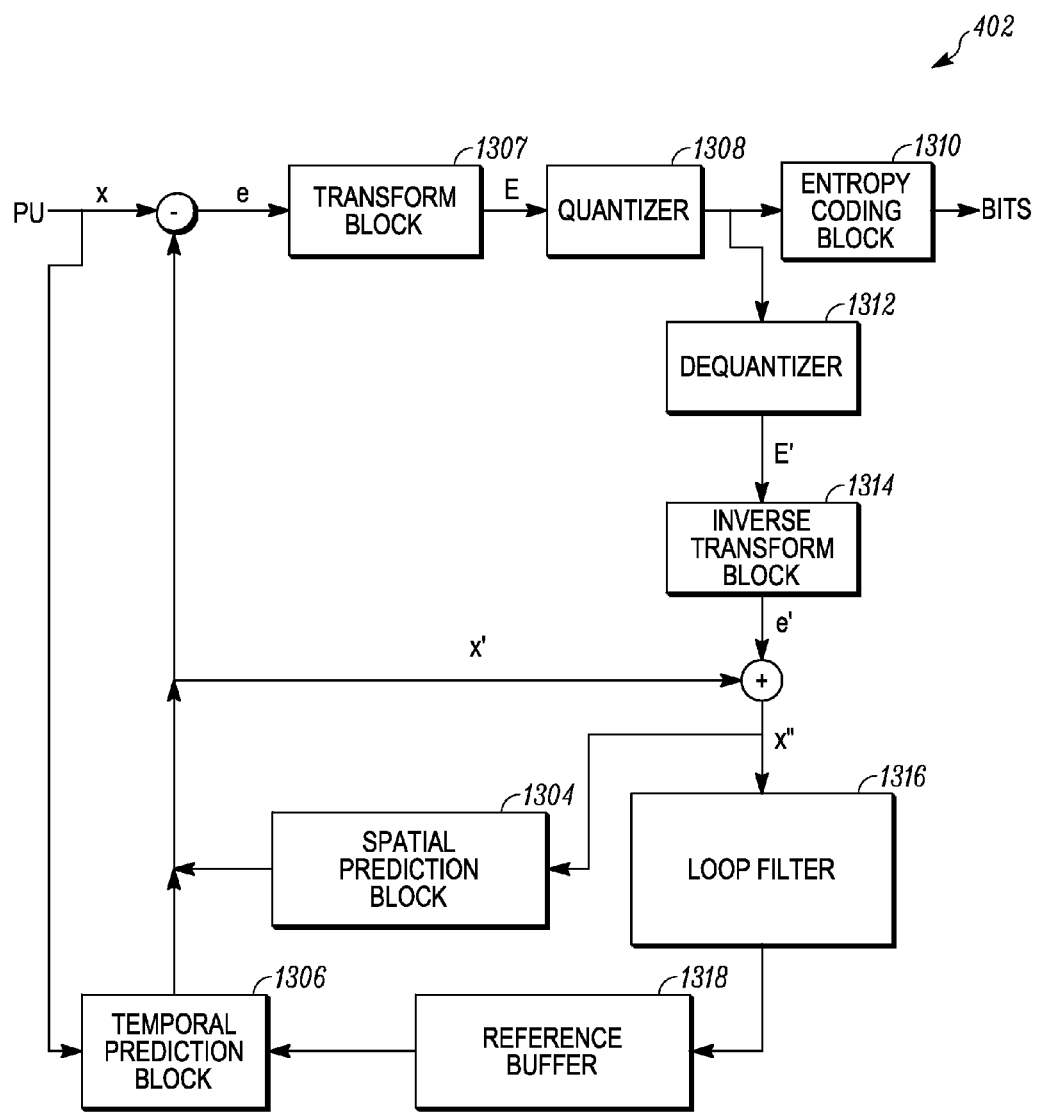
FIG. 13A depicts an example of a encoder according to one embodiment.

In various embodiments, encoder 402 described can be incorporated or otherwise associated with a transcoder or an encoding apparatus at a headend and decoder 403 can be incorporated or otherwise associated with a downstream device, such as a mobile device, a set top box or a transcoder. FIG. 13A depicts an example of encoder 402 according to one embodiment. A general operation of encoder 402 will now be described; however, it will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. Spatial prediction relates to intra mode pictures. Intra mode coding can use data from the current input image, without referring to other images, to code an I picture. A spatial prediction block 1304 may include different spatial prediction directions per PU, such as horizontal, vertical, 45-degree diagonal, 135-degree diagonal, DC (flat averaging), and planar, or any other direction. The spatial prediction direction for the PU can be coded as a syntax element. In some embodiments, brightness information (Luma) and color information (Chroma) for the PU can be predicted separately. In one embodiment, the number of Luma intra prediction modes for all block sizes is 35. An additional mode can be used for the Chroma intra prediction mode. In some embodiments, the Chroma prediction mode can be called "IntraFromLuma."

Temporal prediction block 1306 performs temporal prediction. Inter mode coding can use data from the current input image and one or more reference images to code "P" pictures and/or "B" pictures. In some situations and/or embodiments, inter mode coding can result in higher compression than intra mode coding. In inter mode PUs can be temporally predictive coded, such that each PU of the CU can have one or more motion vectors and one or more associated reference images. Temporal prediction can be performed through a motion estimation operation that searches for a best match prediction for the PU over the associated reference images. The best match prediction can be described by the motion vectors and associated reference images. P pictures use data from the current input image and one or more reference images, and can have up to one motion vector. B pictures may use data from the current input image and one or more reference images, and can have up to two motion vectors. The motion vectors and reference pictures can be coded in the encoded bitstream. In some embodiments, the motion vectors can be syntax elements "MV," and the reference pictures can be syntax elements "refIdx." In some embodiments, inter mode can allow both spatial and temporal predictive coding. The best match prediction is described by the motion vector (MV) and associated reference picture index (refIdx). The motion vector and associated reference picture index are included in the coded bitstream.

Transform block 1307 performs a transform operation with the residual PU, e. A set of block transforms of different sizes can be performed on a CU, such that some PUs can be divided into smaller TUs and other PUs can have TUs the same size as the PU. Division of CUs and PUs into TUs can be shown by a quadtree representation. Transform block 1307 outputs the residual PU in a transform domain, E.

A quantizer 1308 then quantizes the transform coefficients of the residual PU, E. Quantizer 1308 may referred to as quantizer 404-1 of FIG. 4. Quantizer 1308 converts the transform coefficients into a finite number of possible values. In some embodiments, this is a lossy operation in which data lost by quantization may not be recoverable. After the transform coefficients have been quantized, entropy coding block 1310 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 402, a de-quantizer 1312 de-quantizes the quantized transform coefficients of the residual PU. De-Quantizer 1312 may referred to as quantizer 404-1 of FIG. 4. De-quantizer 1312 then outputs the de-quantized transform coefficients of the residual PU, E'. An inverse transform block 1314 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". A loop filter 1316 performs de-blocking on the reconstructed PU, x", to reduce blocking artifacts. Additionally, loop filter 1316 may perform a sample adaptive offset process after the completion of the de-blocking filter process for the decoded picture, which compensates for a pixel value offset between reconstructed pixels and original pixels. Also, loop filter 1316 may perform adaptive loop filtering over the reconstructed PU, which minimizes coding distortion between the input and output pictures. Additionally, if the reconstructed pictures are reference pictures, the reference pictures are stored in a reference buffer 1318 for future temporal prediction. Intra mode coded images can be a possible point where decoding can begin without needing additional reconstructed images.

Figure 13B:
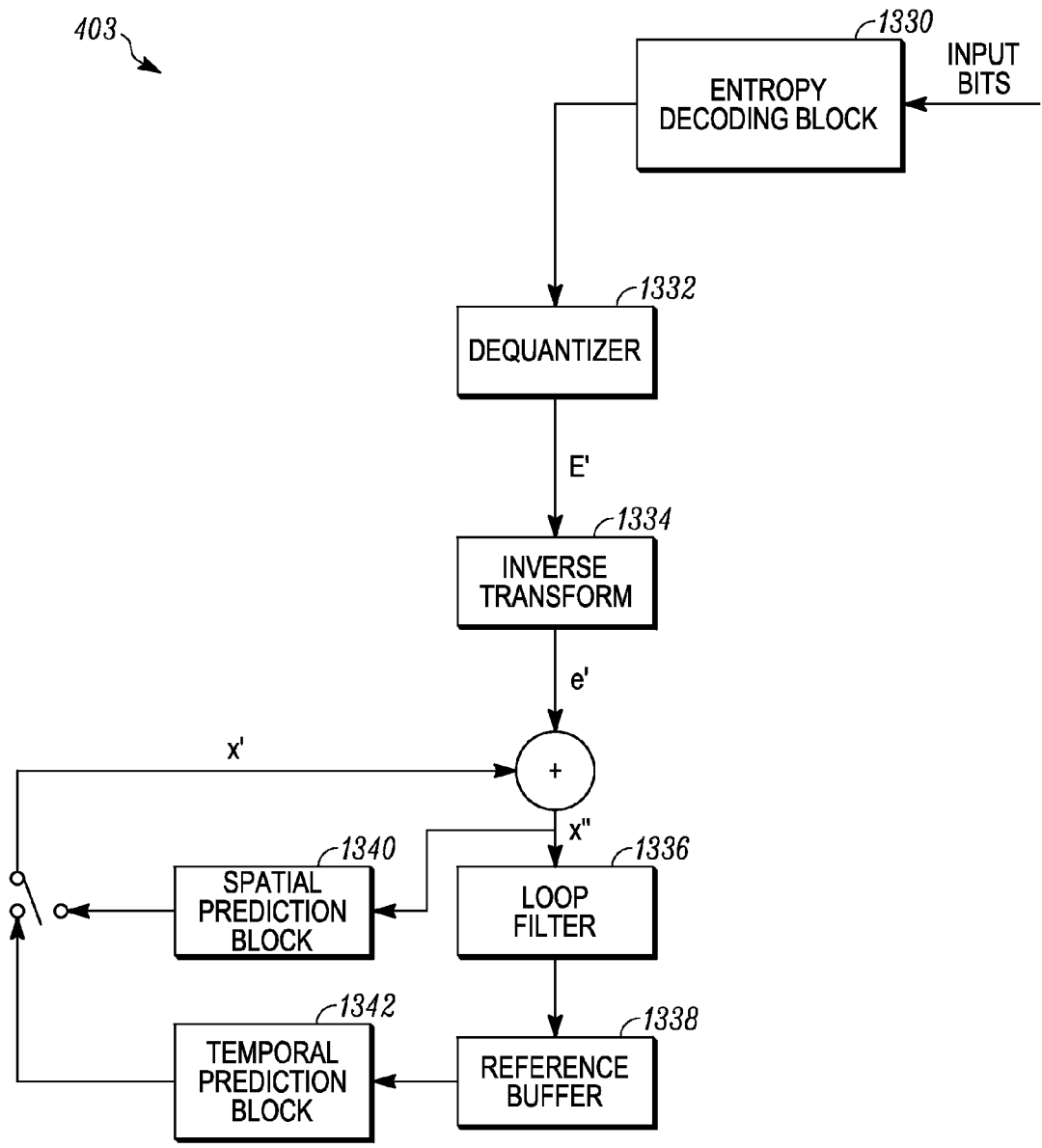
FIG. 13B depicts an example of a decoder according to one embodiment.

FIG. 13B depicts an example of decoder 403 according to one embodiment. A general operation of decoder 403 will now be described; however, it will be understood that variations on the decoding process described will be appreciated by a person skilled in the art based on the disclosure and teachings herein. Decoder 403 receives input bits from encoder 402 for encoded video content.

An entropy decoding block 1330 performs entropy decoding on the input bitstream to generate quantized transform coefficients of a residual PU. A de-quantizer 1332 de-quantizes the quantized transform coefficients of the residual PU. De-quantizer 1332 may referred to as quantizer 404-2 of FIG. 4. De-quantizer 1332 then outputs the de-quantized transform coefficients of the residual PU, E'. An inverse transform block 1334 receives the de-quantized transform coefficients, which are then inverse transformed resulting in a reconstructed residual PU, e'.

The reconstructed PU, e', is then added to the corresponding prediction, x', either spatial or temporal, to form the new reconstructed PU, x". A loop filter 1336 performs de-blocking on the reconstructed PU, x", to reduce blocking artifacts. Additionally, loop filter 1336 may perform a sample adaptive offset process after the completion of the de-blocking filter process for the decoded picture, which compensates for a pixel value offset between reconstructed pixels and original pixels. Also, loop filter 1336 may perform adaptive loop filtering over the reconstructed PU, which minimizes coding distortion between the input and output pictures. Additionally, if the reconstructed pictures are reference pictures, the reference pictures are stored in a reference buffer 1338 for future temporal prediction.

The prediction PU, x', is obtained through either spatial prediction or temporal prediction. A spatial prediction block 1340 may receive decoded spatial prediction directions per PU, such as horizontal, vertical, 45-degree diagonal, 135-degree diagonal, DC (flat averaging), and planar. The spatial prediction directions are used to determine the prediction PU, x'.

A temporal prediction block 1306 performs temporal prediction through a motion estimation operation. A decoded motion vector is used to determine the prediction PU, x'. Interpolation may be used in the motion estimation operation.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

What is claimed is:

1. A method comprising:
   determining, by a processor in response to instructions stored on a non-transitory computer readable medium, whether to use a scaling list for a non-default quantization matrix to perform quantization of one or more units of video;
   identifying a plurality of transform unit sizes;
   determining a set of unavailable transform unit sizes from the plurality of transform unit sizes that are unavailable for performing a transform of the one or more units of video, wherein determining the set of unavailable transform unit sizes includes:
      determining a minimum transform unit size for the one or more units of video,
      determining a maximum transform unit size for the one or more units of video, and
      including each transform unit size from the plurality of transform unit sizes in the set of unavailable transform unit sizes on a condition that the respective transform unit size exceeds a range from the minimum transform unit size to the maximum transform unit size, and omitting each transform unit size from the plurality of transform unit sizes from the set of unavailable transform unit sizes on a condition that the respective transform unit size is within the range;
   determining a set of available transform unit sizes from the plurality of transform unit sizes that are available for transforming the one or more units of video;
   generating encoded scaling list data by encoding scaling list data for each available transform unit size from the set of available transform unit sizes; and
   including the encoded scaling list data in an output bitstream, such that the output bitstream omits scaling list data for the set of unavailable transform unit sizes.

2. The method of claim 1, wherein determining the set of available transform unit sizes includes:
   including each transform unit size from the plurality of transform unit sizes in the set of available transform unit sizes on a condition that the respective transform unit size is within the range, and omitting each transform unit size from the plurality of transform unit sizes from the set of available transform unit sizes on a condition that the respective transform unit size exceeds the range.

3. The method of claim 1, wherein determining the set of unavailable transform unit sizes includes determining whether to use a non-flat scaling list for encoding the one or more units of video.

4. The method of claim 3, wherein determining the set of unavailable transform unit sizes includes determining whether to use non-default scaling list data for the non-flat scaling list for encoding the one or more units of video.

5. The method of claim 1, wherein encoding the scaling list data is performed for a series of pictures that includes the one or more units of video.

6. The method of claim 1, wherein encoding the scaling list data is performed for a picture that includes the one or more units of video.

7. The method of claim 1, wherein encoding the scaling list data is performed separately for a series of pictures that includes the one or more units of video and for a picture that includes the one or more units of video.

8. The method of claim 7, wherein the scaling list data for the picture modifies the scaling list data for the series of pictures.

9. A method of video coding, the method comprising:
   identifying a portion of an input video stream, wherein the portion includes a plurality of blocks;
   identifying a plurality of transform unit sizes, wherein identifying the plurality of transform unit sizes includes:
      identifying a minimum transform unit size from the plurality of transform unit sizes based on the plurality of blocks, and
      identifying a maximum transform unit size from the plurality of transform unit sizes based on the plurality of blocks, wherein for each transform unit size from the plurality of transform unit sizes identifying the set of available transform unit sizes includes:
         on a condition that the transform unit size exceeds the minimum transform unit size and is within the maximum transform unit size, including the transform unit size in the set of available transform unit sizes; and
         on a condition that the transform unit size is less than the minimum transform unit size or exceeds the maximum transform unit size, omitting the transform unit size from the set of available transform unit sizes;
   identifying a set of available transform unit sizes from the plurality of transform unit sizes, wherein each available transform unit size from the set of transform unit sizes is available for transforming at least one block from the plurality of blocks;
   generating, by a processor in response to instructions stored on a non-transitory computer readable medium, encoded scaling list data for the set of available transform unit sizes;
   including the encoded scaling list data in an output bitstream, such that the output bitstream omits scaling list data for unavailable transform unit sizes from the plurality of transform unit sizes, wherein the set of available transform unit sizes omits the unavailable transform unit sizes; and
   transmitting or storing the output bitstream.

10. The method of claim 9, wherein the portion is a picture parameter set.

11. The method of claim 9, wherein the portion is a sequence parameter set.

12. A method of video coding, the method comprising:
   identifying a portion of an input video stream, wherein the portion includes a plurality of blocks;
   identifying a plurality of transform unit sizes, wherein identifying the plurality of transform unit sizes includes:
      identifying a minimum transform unit size from the plurality of transform unit sizes based on the plurality of blocks, and
      identifying a maximum transform unit size from the plurality of transform unit sizes based on the plurality of blocks, wherein for each transform unit size from the plurality of transform unit sizes identifying the set of available transform unit sizes includes:
         on a condition that the transform unit size exceeds the minimum transform unit size and is within the maximum transform unit size, including the transform unit size in the set of available transform unit sizes; and on a condition that the transform unit size is less than the minimum transform unit size or exceeds the maximum transform unit size, omitting the transform unit size from the set of available transform unit sizes;

identifying a set of available transform unit sizes from the plurality of transform unit sizes, wherein each available transform unit size from the set of transform unit sizes is available for transforming at least one block from the plurality of blocks;

generating, by a processor in response to instructions stored on a non-transitory computer readable medium, encoded scaling list data for the set of available transform unit sizes;

including the encoded scaling list data in an output bitstream, such that the output bitstream omits scaling list data for unavailable transform unit sizes from the plurality of transform unit sizes, wherein the set of available transform unit sizes omits the unavailable transform unit sizes, wherein including the encoded scaling list data in the output bitstream includes:

on a condition that the portion is a picture parameter set, including a picture parameter set scaling list data present flag in the output bitstream, and on a condition that the portion is a sequence parameter set, including a sequence parameter set scaling list data present flag in the output bitstream; and transmitting or storing the output bitstream.

* * * * *